United States Patent
Kuehn et al.

(10) Patent No.: US 12,438,487 B2
(45) Date of Patent: Oct. 7, 2025

(54) METHOD FOR CONTROLLING A MOTOR, AN ACCORDINGLY CONTROLLED MOTOR AND A COMPRESSOR SYSTEM HAVING SUCH A MOTOR

(71) Applicant: Robert Bosch GmbH, Stuttgart (DE)

(72) Inventors: Timo Kuehn, Oetigheim (DE); Tobias Wuerth, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 113 days.

(21) Appl. No.: 18/549,487

(22) PCT Filed: Mar. 8, 2022

(86) PCT No.: PCT/EP2022/055787
§ 371 (c)(1),
(2) Date: Sep. 7, 2023

(87) PCT Pub. No.: WO2022/189373
PCT Pub. Date: Sep. 15, 2022

(65) Prior Publication Data
US 2024/0171104 A1   May 23, 2024

(30) Foreign Application Priority Data

Mar. 9, 2021 (DE) .................... 10 2021 202 267.7
Mar. 7, 2022 (DE) .................... 10 2022 202 274.2

(51) Int. Cl.
*H02P 3/00* (2006.01)
*H02P 23/04* (2006.01)

(52) U.S. Cl.
CPC .................... *H02P 23/04* (2013.01)

(58) Field of Classification Search
CPC .... H02P 23/04; H02P 6/10; H02P 6/14; H02P 29/50
See application file for complete search history.

(56) References Cited

U.S. PATENT DOCUMENTS

| 2013/0193898 | A1 | 8/2013 | Williams et al. |
| 2014/0191699 | A1* | 7/2014 | Dixon ............... H02P 21/05 318/504 |
| 2020/0412292 | A1 | 12/2020 | Hayashi et al. |

FOREIGN PATENT DOCUMENTS

| DE | 102012107970 A1 | 2/2013 |
| EP | 2073375 A1 | 6/2009 |
| EP | 4287497 A1 * | 12/2023 ............ H02P 21/05 |

OTHER PUBLICATIONS

Translation of International Search Report for Application No. PCT/EP2022/055787 dated Jun. 22, 2022 (2 pages).

* cited by examiner

*Primary Examiner* — Karen Masih
(74) *Attorney, Agent, or Firm* — Michael Best & Friedrich LLP

(57) ABSTRACT

The invention is based on a method for controlling a motor, in particular an electrically commutated motor, wherein at least one method step comprises using a control loop (14) to ascertain a controlled variable (16) on the basis of which a variation in an operating parameter of the motor is at least partially compensated for.
It is proposed that the method comprises at least one adjustment step (18) that comprises logically combining the ascertained controlled variable (16) with an adjustment variable (20) in order to counteract at least one harmonic oscillation of the operating parameter.

11 Claims, 3 Drawing Sheets

METHOD FOR CONTROLLING A MOTOR, AN ACCORDINGLY CONTROLLED MOTOR AND A COMPRESSOR SYSTEM HAVING SUCH A MOTOR

BACKGROUND OF THE INVENTION

A method for controlling a motor, in particular an electrically commutated motor, has already been proposed, in which in at least one method step a controlled variable is ascertained in a control loop, as a function of which a variation in an operating parameter of the motor is at least partially compensated for.

SUMMARY OF THE INVENTION

The invention is based on a method for controlling a motor, in particular an electrically commutated motor, wherein in at least one method step a controlled variable is ascertained in a control loop, as a function of which a variation in an operating parameter of the motor is at least partially compensated for.

It is proposed that the method comprises at least one adjustment step in which the ascertained controlled variable is logically combined with an adjustment variable to counteract at least one harmonic oscillation of the operating parameter. The motor preferably drives a load, such as a compressor, pump, vehicle, tool, effector, or the like. In particular, the load has a work cycle that comprises at least two phases with different power requirements for the motor. In particular, the method is designed to adapt the operating parameter to a target value and to keep it constant, especially during the entire work cycle of the load, in particular despite the temporally, especially cyclically, changing power demand of the load on the motor. The term "provided" is understood in particular to mean specifically configured, specifically programmed, specifically designed, and/or specifically equipped. An object being provided for a particular function is understood in particular to mean that the object fulfills and/or performs this particular function in at least one application state and/or operating state.

Preferably, the operating parameter is designed as a speed. Alternatively, the operating parameter is designed as torque or magnetic flux. Preferably, the control loop comprises an operating parameter controller. In particular, the operating parameter controller processes a deviation of an actual value of the operating parameter from the target value to the controlled variable in a control step of the method. Preferably, the control loop comprises a motor control. In particular, in an actuating step of the method, the motor control converts the controlled variable into an actuating variable, in particular into an electrical voltage and/or into an electrical current, in order to set the actual value of the operating parameter of the motor. The actual value of the operating parameter can be measured, for example via a Hall sensor of the control loop on the motor, or ascertained via a sensorless method, in particular by an evaluation of the at least one actuating variable.

In particular, if a response time of the operating parameter controller is slower than the temporal, in particular cyclic, change of the power demand of the load, the harmonic oscillation of the operating parameter may occur, in particular with a frequency component of the change of the power demand of the load or a harmonic thereof. In particular, the adjustment step is designed to counteract at least one harmonic or more harmonics of the operating parameter. The adjustment step is preferably performed in terms of signal technology between the control step and the actuating step. A control unit of the motor comprising the control loop of the motor preferably additionally comprises a harmonic controller. Preferably, the harmonic controller creates the adjustment variable. In particular, in the adjustment step, the harmonic controller adjusts a value of the controlled variable by linking it to the adjustment variable. For example, the harmonic controller adds, subtracts, multiplies, divides, and/or folds the controlled variable and the adjustment variable together or away from each other. The harmonic controller preferably imprints a change corresponding to the temporal, in particular cyclic, change of the operating parameter on the controlled variable by means of the adjustment variable. By a comparison change "corresponding change" shall be understood in particular a change with a temporal parallel course to the comparison change or a moving average of the comparison change, in particular a course with the same frequency or with a frequency divided by a natural number as the comparison change.

Particularly preferably, the adjustment step keeps an amplitude of the harmonic oscillation at least below a maximum permissible value. Preferably, the adjustment variable changes, in particular cyclically, a power provision of the motor, in particular while maintaining the current value of the operating parameter.

The embodiment according to the invention can advantageously minimize a risk of occurrence of oscillations of a motor-load system. In particular, oscillations occurring in the motor-load system can be advantageously damped, and in particular an amplitude of an occurring oscillation can be kept advantageously low. In particular, the motor can be operated with an advantageously large variety of loads. In particular, the motor can also drive loads with power demand variations in an advantageously stable manner. Furthermore, the motor can be operated advantageously quietly.

It is further proposed that in at least one method step of the method, the adjustment variable is set by means of a further control loop. In particular, the further control loop comprises the harmonic controller. Preferably, the control loop and the further control loop are designed to partially overlap. In particular, the further control loop comprises the motor control. Preferably, the further control loop has at least one branch which is not part of the control loop and in which, in particular, the harmonic controller is arranged. Preferably, the control loop has at least one branch which is not part of the further control loop and in which, in particular, the operating parameter controller is arranged. In particular, the further control loop processes feedback from the motor. In particular, the harmonic controller creates the adjustment variable as a function of the feedback. As an alternative to the further control loop, the harmonic controller ascertains the adjustment variable from a set of tables, a model, or an approximate function of the motor-load system stored in a memory of the control unit. The embodiment according to the invention makes it possible to dispense with precise detection and/or modeling of an interaction of the motor and the load in advance of an operation. In particular, the motor can react flexibly to the possible occurrence of load variations.

It is further proposed that in at least one method step of the method, the adjustment variable is set as a function of an actual value of the operating parameter. In particular, during the feedback of the further control loop, the actual value of the operating parameter is transmitted to the harmonic controller. In particular, the harmonic controller ascertains the adjustment variable as a function of the actual value of the operating parameter. In an alternative embodiment, a further operating parameter different from the operating parameter is transmitted to the harmonic controller during feedback. Particularly preferably, the actual value of the speed is transmitted to the harmonic controller. Alternatively, an actual value of the torque or the magnetic flux of the motor is transmitted to the harmonic controller. Particularly preferably, especially in addition to the operating parameter, a rotational position of a rotor of the motor relative to a stator of the motor is transmitted to the harmonic controller. Due to the embodiment according to the invention, the adjustment variable can advantageously be created flexibly. Furthermore, the method can be implemented with advantageously few additional components to the control loop.

It is further proposed that in at least one method step of the method, a characteristic variable of the harmonic oscillation is determined for setting the adjustment variable. In particular, the harmonic controller ascertains the characteristic variable based on the feedback, especially the actual value of the operating parameter. In particular, the harmonic controller analyzes the feedback, especially the actual value of the operating parameter with respect to the harmonic oscillation. For example, the harmonic controller performs a Fourier transform, in particular a Fast Fourier Transform (FFT), to ascertain the characteristic value of the harmonic oscillation, in particular all oscillations, of the operating parameter. In particular, the characteristic variable is designed as a Fourier amplitude or is calculated from a Fourier amplitude of the harmonic oscillation. Alternatively, the harmonic controller demodulates the feedback, especially the actual value of the operating parameter. In particular, the characteristic value is an amplitude of the harmonic oscillation or is calculated from an amplitude of the harmonic oscillation. In particular, the harmonic controller processes the rotational position of the rotor of the motor to analyze the feedback, especially the actual value of the operating parameter. By means of the embodiment according to the invention, the adjustment variable can be advantageously tuned to the harmonic oscillation in a targeted manner. In particular, the risk of overdriving can be kept to a minimum. In particular, the harmonic oscillation can be advantageously compensated in isolation.

It is further proposed that, in at least one method step of the method, the adjustment variable is created as a function of a time constant harmonic target value of the harmonic oscillation. In particular, the harmonic target value controls the characteristic value to the harmonic target value. Preferably, the harmonic controller generates a harmonic controlled variable which is further processed, in particular, to the adjustment variable. In particular, the harmonic controller changes the harmonic controlled variable until a deviation of the characteristic value from the harmonic target value is within a tolerance band around the harmonic target value. Alternatively, the harmonic target value is a threshold value for the characteristic value, with the harmonic controller changing the harmonic controlled variable in particular until the characteristic value falls below the harmonic target value. Preferably, the harmonic target value is stored in the memory of the control unit and, in particular, is unchangeable. Particularly preferably, the harmonic target value is zero. Alternatively, the harmonic target value has a non-zero value. A further harmonic target value for a further harmonic oscillation of the operating parameter may be equal to the harmonic target value or have a different value from the harmonic target value. The embodiment according to the invention can advantageously limit an oscillating behavior of the motor-load system.

Furthermore, it is proposed that in at least one method step of the method, the adjustment variable is created as a trigonometric function. Preferably, the harmonic controller creates the adjustment variable as a sine, a cosine, or a linear combination thereof. In particular, the harmonic controller modulates the harmonic controlled variable to create the adjustment variable. In particular, the adjustment variable is logically combined with the controlled variable in a modulated state. Due to the embodiment according to the invention, the adjustment variable can be implemented with advantageously low effort. In particular, the method can be applied to any designed load on the motor with advantageously low configuration effort.

It is further proposed that in at least one method step of the method, the adjustment variable is created as a function of a load profile, in particular a harmonic load profile, of a load driven by the motor. In particular, the load profile has the power demand of the load as a function of a temporal position within the work cycle of the load. For example, the load profile is formed as a load-torque harmonic spectrum. In particular, the load profile is designed as the torque required for the load as a function of a rotational position of the load and/or the rotor of the motor, especially at constant speed. The load profile is preferably ascertained in advance of an operation of the motor and stored in the memory of the control unit. The load profile can, for example, take the form of a table, a theory curve, a regression curve, or the like. Optionally, the load profile can be split into Fourier components. Preferably, the load profile is designed as a normalized load profile. In particular, the load profile has an average value of zero. Alternatively, the load profile has a non-zero average value that is used for feedforward control, for example. In particular, the harmonic controller outputs the load profile as an adjustment variable, which is adjusted to a current expression of the harmonic oscillation in particular as a function of the harmonic controlled variable, i.e., in particular as a function of the actual value of the operating parameter. In particular, the harmonic controller scales the load profile depending on the deviation of the characteristic value from the harmonic target value. In particular, the harmonic controller performs a phase shift of the load profile depending on the rotational position of the rotor. By means of the embodiment according to the invention, the method can advantageously be specifically adapted to a load. In particular, a deviation of the power demand of the load from the load provided by the motor can be kept advantageously low. In particular, generation of the harmonic oscillation can be effectively counteracted, especially prevented.

It is further proposed that, in at least one method step of the method, a current flow to the motor is set in dependence on the controlled variable logically combined with the adjustment variable, which current flow has an oscillation that is phase-rigid to the harmonic oscillation. In particular, the motor control adjusts the current flow to the motor as a function of the controlled variable logically combined with the adjustment variable. In particular, the oscillation has the same frequency as the harmonic oscillation or as a fundamental oscillation belonging to the harmonic oscillation. In particular, the fundamental and harmonic oscillations have an integer frequency ratio. Due to the design according to the invention, the operating parameter can be kept advantageously stable despite fluctuating power demand of the load.

It is further suggested that the adjustment variable is in the form of torque. Preferably, the adjustment variable formed as torque is logically combined to the controlled variable formed as torque.

Furthermore, a motor with at least one control unit is proposed for carrying out a method according to the invention. The motor is preferably designed as an electrically commutated motor. In particular, the motor comprises the stator and the rotor. Preferably, the motor comprises at least one motor shaft arranged on the rotor, in particular for transmitting a torque to the load. Preferably, the motor comprises the motor control for setting the electrical voltage or current to operate the motor. The motor control can be integrated into the control unit or designed as a separate component. Preferably, the control unit comprises at least the harmonic controller. Preferably, the control unit comprises the memory, in particular for storing the load profile of the load and/or the harmonic target value. Preferably, the harmonic controller comprises an integral controller for creating the adjustment variable, in particular the harmonic controlled variable. In particular, the motor comprises the operating parameter controller. The operating parameter controller comprises, for example, a proportional controller and optionally an integral controller and/or differential controller (P, PI, PD, and/or PID controller) for ascertaining the controlled variable. The operating parameter controller can be integrated into the control unit or designed as a separate, in particular standardized, component. The design according to the invention can provide an advantageously low-oscillation and, in particular, low-noise motor. In particular, a motor can be provided that can be operated with advantageously stable operating parameters despite fluctuating power requirements.

Furthermore, a compressor system with at least one compressor and at least one motor according to the invention for driving the compressor is proposed. In particular, the compressor system is intended for use in an air conditioner, a heat pump, a refrigerating machine, a vacuum pump, a G-charger or the like. The compressor is designed, for example, as a scroll compressor, a vane compressor or a reciprocating compressor or the like. Preferably, the compressor comprises at least one compressor chamber for receiving a fluid to be compressed. Preferably, the compressor comprises, in particular within the compressor chamber, at least one compressor element which is arranged on the motor shaft, in particular eccentrically. The motor is preferably provided to move the compressor element relative to the compressor chamber and, in particular, thereby compress the fluid. For example, the compressor element is designed as a volute, a piston, a rotary vane, or the like. In particular, the compressor is the load, which is connected to the motor. The work cycle of the compressor comprises, for example, admitting the fluid into the compressor chamber, compressing the fluid by the compressor element, discharging the compressed fluid from the compressor chamber, and optionally, a reset phase to return to an initial position of the compressor element prior to a further admission of the fluid. In particular, the power demand of the compressor on the motor increases with a degree of compression of the fluid. In particular, the power demand of the compressor on the motor reaches a maximum value at a maximum compression of the fluid. In particular, the power demand of the compressor on the motor drops to a minimum value during the fluid inlet and/or the reset phase. The design according to the invention can provide an advantageously low-oscillation and, in particular, low-noise compressor system.

The method according to the invention, the motor according to the invention and/or the compressor system according to the invention shall/should not be limited here to the application and embodiment described above. In particular, the method according to the invention, the motor according to the invention, and/or the compressor system according to the invention may have a number of individual elements, components, and units, as well as method steps, that deviates from a number specified herein in order to fulfill a mode of operation described herein. Moreover, in the case of the value ranges specified in this disclosure, values lying within the mentioned limits are also to be considered as disclosed and usable as desired.

BRIEF DESCRIPTION OF THE DRAWINGS

Further advantages will become apparent from the following description of the drawings. The drawings illustrate an exemplary embodiment of the invention. The drawings, the description, and the claims contain numerous features in combination. The person skilled in the art will appropriately also consider the features individually and combine them to form further meaningful combinations.

Shown are.

DETAILED DESCRIPTION

Figure 1:
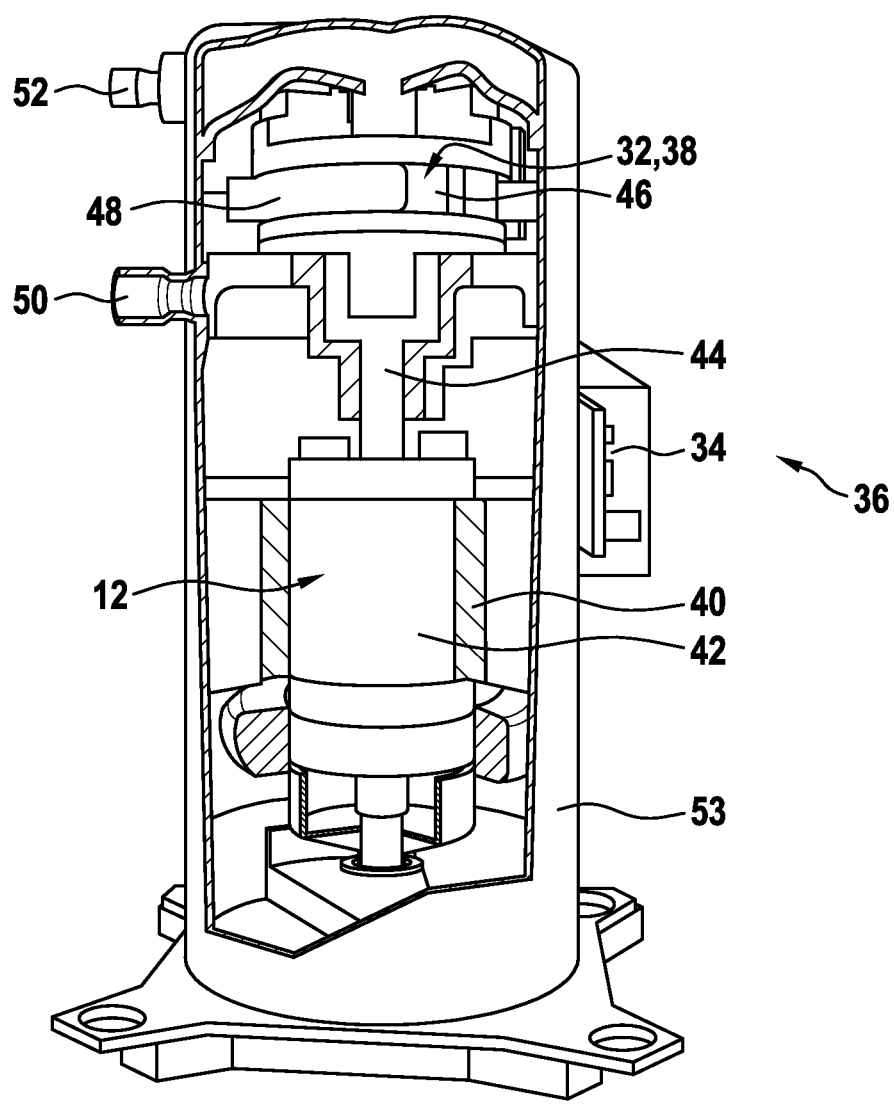
FIG. 1A schematic diagram of a compressor system according to the invention with a motor according to the invention and a compressor, FIG. 2 a schematic representation of a control loop and a further control loop for an implementation of a method according to the invention, FIG. 3 a schematic representation of a branch of the further control loop which is not part of the control loop, and FIG. 4 a schematic load-torque spectrum of the compressor.

FIG. 1 shows a compressor system 36. The compressor system 36 comprises at least one compressor 38. The compressor system 36 comprises at least one motor 12 for driving the compressor 38. In particular, the compressor 38 represents a load 32 connected to the motor 12. The compressor system 36 preferably comprises a housing 53. Preferably, the compressor 38 is disposed within the housing 53. Preferably, the motor 12 is arranged in the housing 53.

The motor 12 is designed in particular as an electrically commutated motor. In particular, the motor 12 comprises at least one stator 40. Preferably, the stator 40 comprises at least one electromagnet. In particular, the motor 12 comprises a rotor 42. In particular, the rotor 42 comprises at least one permanent magnet. In particular, the motor 12 comprises at least one motor shaft 44. In particular, the motor shaft 44 is non-rotatably connected to the rotor 42. In particular, the motor 12 and the compressor 38 have a common axis of rotation. The motor 12 comprises at least one control unit 34, in particular for controlling the motor 12 and in particular for supplying power to the stator 40. The control unit 34 is provided for carrying out a method 10, which is explained in more detail in FIGS. 2 to 4.

The compressor 38 is designed as a scroll compressor, for example. In particular, the compressor 38 comprises at least one eccentric volute 46 as a compressor element. The eccentric volute 46 is preferably arranged in a rotationally fixed manner and, in particular, eccentrically on the motor shaft 44. Preferably, the compressor 38 comprises at least one fixed volute 48. In particular, the fixed volute 48 is rigidly connected to the housing 53. The fixed volute 48 and the eccentric volute 46 are arranged, in particular, intermeshing. Preferably, the compressor 38 comprises a compressor chamber, which is in particular delimited at least by the housing 53. In particular, the eccentric volute 46 and the fixed volute 48 are arranged in the compressor chamber. The compressor 38 comprises, particularly on the housing 53, a fluid inlet 50 for admitting a fluid to be compressed into the compressor chamber, particularly into a space between the fixed volute 48 and the eccentric volute 46. Preferably, the compressor 38 comprises, particularly on the housing 53, a fluid outlet 52 to an outlet of the compressed fluid from the compressor chamber, particularly from the space between the fixed volute 48 and the eccentric volute 46.

Figure 2:
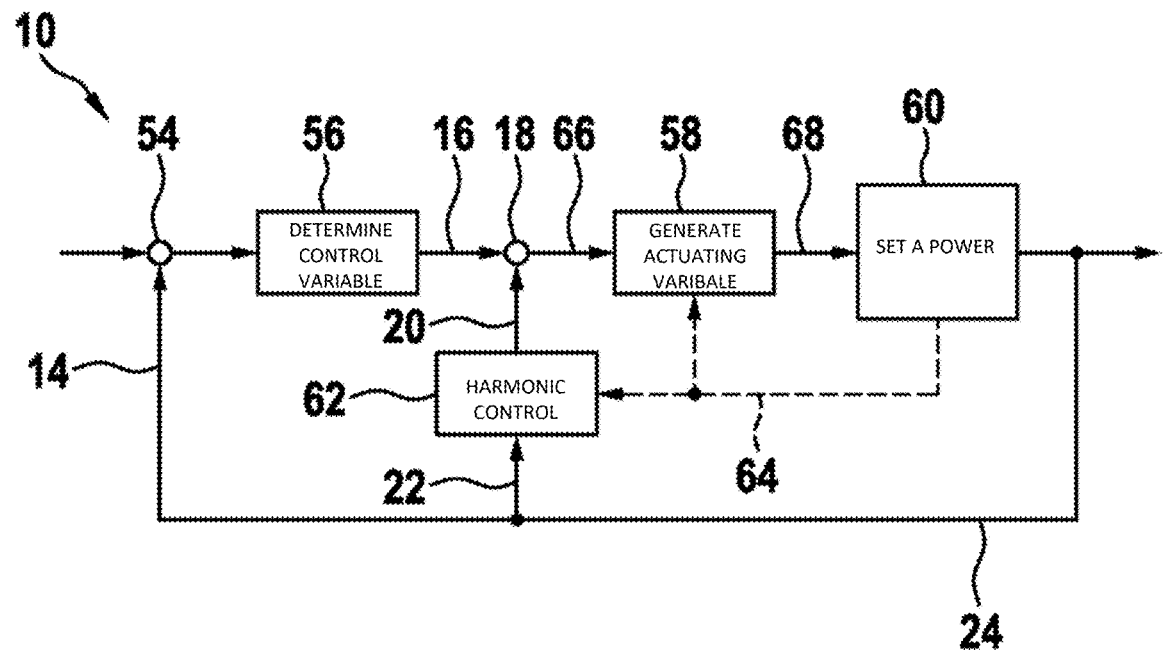

FIG. 2 shows the method 10 for controlling the motor 12. In particular, the method 10 is provided for controlling, in particular keeping constant, at least one operating parameter of the motor 12. Particularly preferably, the operating parameter is in the form of speed. In at least one method step of method 10, a controlled variable 16 is ascertained in a control loop 14. In particular, the controlled variable 16 is ascertained by an operating parameter controller of the control unit 34 in a control step 56 of the method 10. The operating parameter controller ascertains the controlled variable 16 in particular as a function of an actual value 24 of an operating parameter. In particular, in a comparison step 54 of the method 10, the control unit 34 compares the actual value 24 of the operating parameter to an operating parameter target value. In particular, the operating parameter controller ascertains the controlled variable 16 as a function of a deviation of the actual value 24 of the operating parameter from the operating parameter target value. In particular, the controlled variable 16 is designed as a torque. Preferably, the adjustment variable 20 is designed as a torque. In particular, a motor control of the control unit 34 generates an actuating variable 68 in response to the controlled variable 16 in a motor control step 58 of the method 10. The actuating variable 68 is designed in particular as an electric current or electric voltage. In particular, in a motor operation 60 of the method 10, the actuating variable 68 sets a power provided by the motor 12 and in particular the operating parameter. In particular, the control unit 34 monitors the operating parameter during motor operation 60. In particular, the control unit 34 generates the actual value 24 of the operating parameter using a sensor-less method. Preferably, during motor operation 60, the control unit 34 ascertains a rotational position 64 of the rotor 42 relative to the stator 40. In particular, the motor control creates the actuating variable 68 as a function of the rotational position 64 of the rotor 42. In particular, the operating parameter controller, the motor control and the rotor 42 and stator 40 form the control loop 14. Depending on the controlled variable 16, a variation in the operating parameter of the motor 12 is at least partially compensated for, in particular by the control loop 14.

Figure 3:
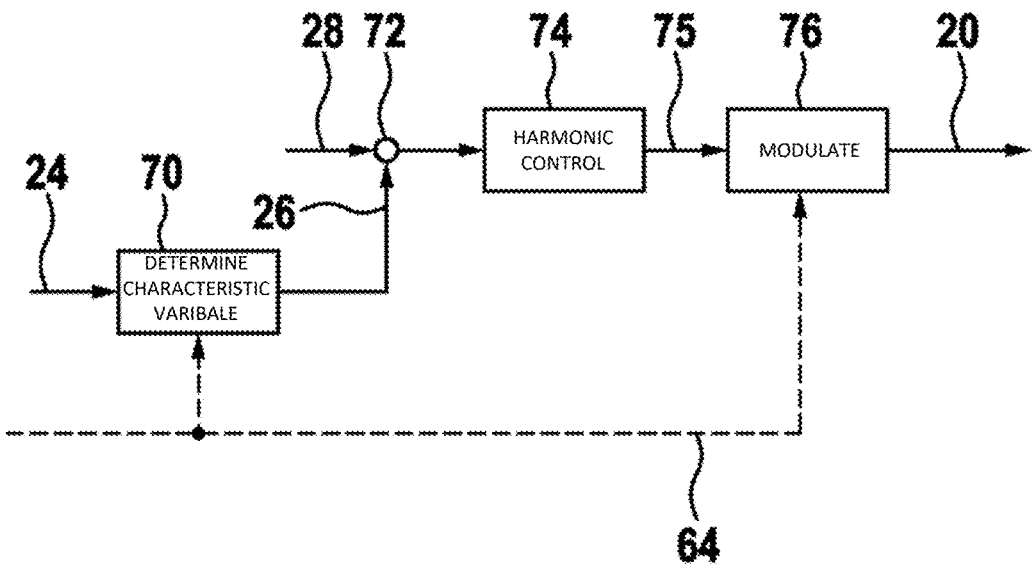

The method 10 comprises at least one adjustment step 18. In the adjustment step 18, the ascertained controlled variable 16 is logically combined to an adjustment variable 20. The adjustment step 18 is provided to counteract at least one harmonic oscillation of the operating parameter. In particular, the adjustment step 18 adds the adjustment variable 20 to the controlled variable 16. In particular, the controlled variable 16 logically combined with the adjustment variable 20 form an adjusted controlled variable 66. Particularly preferably, the motor control creates the actuating variable 68 as a function of the adjusted controlled variable 66. In particular, the adjustment variable 20 is created by a harmonic controller of the control unit 34 in a harmonic control 62 of the method 10. Details of the harmonic control 62 are shown in FIG. 3. The adjustment variable 20 is set by means of another control loop 22. In particular, the harmonic controller, the motor control, the stator 40 and the rotor 42 form the further control loop 22. In particular, the control loop 14 and the further control loop 22 are designed to partially, in particular only partially, overlap. The adjustment variable 20 is set by the harmonic controller as a function of the actual value 24 of the operating parameter. In particular, the adjustment variable 20 is set by the harmonic controller as a function of the rotational position 64 of the rotor 42.

FIG. 3 shows method steps of the harmonic control 62. In particular, the harmonic control 62 comprises a characteristic value ascertaining step 70. In the characteristic value ascertaining step 70, a characteristic variable 26 of the harmonic oscillation is determined for setting the adjustment variable 20. In particular, the harmonic controller analyzes the actual value 24 of the operating parameter in the characteristic value ascertaining step 70. Particularly preferably, the harmonic controller performs a demodulation of the actual value 24 of the operating parameter in the characteristic value ascertaining step 70. In particular, the harmonic controller transfers a carrier band of the actual value 24 to a base band of the actual value 24. Alternatively, the harmonic controller performs a fast Fourier transform of the actual value 24 of the operating parameter in the characteristic value ascertaining step 70. In particular, the harmonic controller creates the characteristic value 26 as a function of the rotational position 64 of the rotor 42. Particularly preferably, the characteristic value 26 is formed as the amplitude of the harmonic oscillation.

In particular, the harmonic control 62 comprises a harmonic matching step 72. In the harmonic matching step 72, the characteristic variable 26 is compared, in particular, to a harmonic target value 28. Particularly preferably, the harmonic target value 28 is zero. In particular, the harmonic controller ascertains a deviation of the characteristic variable 26 from the harmonic target value 28 in the harmonic adjustment step 72. The adjustment variable 20 is created as a function of the time constant harmonic target value 28 of the harmonic oscillation. In particular, in a harmonic control step 74, the harmonic controller creates a harmonic controlled variable 75 as a function of the harmonic target value 28. In particular, in the harmonic control step 74, the harmonic controller ascertains a torque that counteracts the harmonic oscillation of the operating parameter. In particular, in the harmonic control step 74, the harmonic controller determines an amplitude and/or phase of the adjustment variable 20 as a function of the deviation of the characteristic value 26 from the harmonic target value 28.

In particular, the harmonic control 62 comprises a modulation step 76. In the modulation step 76, the adjustment variable 20 is created as a trigonometric function. In particular, the adjustment variable 20 has an integer frequency relationship with the harmonic oscillation. The adjustment variable 20 preferably has the same or a lower frequency, in particular a fundamental frequency, of the harmonic oscillation. Alternatively, or in addition, the adjustment variable 20 is created in the modulation step 76 as a function of a harmonic load profile 30 of the load 32 driven by the motor 12. Optionally, the harmonic load profile 30 is approximated by trigonometric functions. In particular, the adjustment variable 20 is created as a function of the rotational position 64 of the rotor 42. In particular, in the modulation step 76, the adjustment variable 20 is created in synchronization with the rotational position 64 of the rotor 42. In the motor control step 58 (cf. FIG. 2), as a function of the controlled variable 16 logically combined with the adjustment variable 20, a current flow to the motor 12 is set which has an oscillation which is phase-rigid to the harmonic oscillation.

Figure 4:
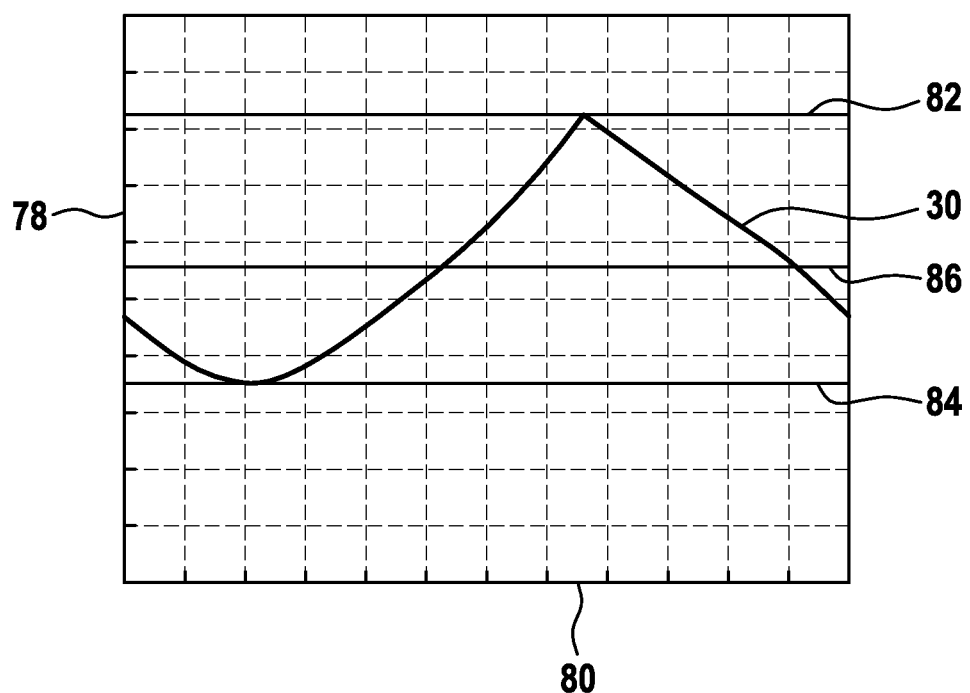

FIG. 4 shows an example of the harmonic load profile 30 of the load 32, in particular the compressor 38. In particular, FIG. 4 shows a torque 78 required by the load 32 plotted against a load rotational position 80 of the load 32, especially at constant speed. Preferably, the load rotational position 80 is identical to the rotation position 64 of the rotor 42. Alternatively, a transmission ratio between the motor 12 and the compressor 38 is stored in a memory of the control unit. Alternatively, the load rotational position 80 is detected, for example with a Hall sensor, a light barrier or the like. In particular, the torque 78 required by the load 32 has a maximum value 82 and a minimum value 84 during a work cycle of the load 32. In particular, the torque 78 required by the load 32 oscillates between the minimum value 84 and the maximum value 82. In particular, the operating parameter controller and the controlled variable 16 control an average value 86 of the torque 78 required by the load 32. In particular, the harmonic controller and the adjustment variable 20 replicate the oscillation between the maximum value 82 and the minimum value 84. In particular, the adjustment variable 20 is provided to at least partially compensate for a deviation of the torque provided by the motor 12, in particular at constant speed, from the torque 78 required by the load 32. In particular, the harmonic load profile 30 is scaled in the harmonic control step 74 as a function of a deviation of the characteristic value 26 from the harmonic target value 28. In particular, the harmonic load profile 30 is synchronized with the rotational position 64 of the rotor 42 in the modulation step 76.

The invention claimed is:

1. A method for controlling a motor, the method comprising:
determining, via a control unit (34), a controlled variable (16) in a control loop (14),
compensating, via the control unit (34) a variation in an operating parameter of the motor, by adjusting (18) the controlled variable (16) by logically combining the controlled variable (16) to an adjustment variable (20) to counteract at least one harmonic oscillation of the operating parameter, wherein a characteristic variable (26) of the harmonic oscillation is determined for setting the adjustment variable (20), wherein the characteristic variable (26) is an amplitude of the harmonic oscillation.

2. The method according to claim 1, wherein the adjustment variable (20) is set by means of a further control loop (22).

3. The method according to claim 1, wherein the adjustment variable (20) is set as a function of an actual value (24) of the operating parameter.

4. The method according to claim 1, wherein the adjustment variable (20) is created as a function of a harmonic target value (28) of the harmonic oscillation which is constant in time.

5. The method according to claim 1, wherein the adjustment variable (20) is created as a trigonometric function.

6. The method according to claim 1, wherein the adjustment variable (20) is created as a function of a load profile (30) of a load (32) driven by the motor.

7. The method according to claim 1, wherein based on the controlled variable (16) logically combined with the adjustment variable, a current flow to the motor is set which has an oscillation which is phase-rigid to the harmonic oscillation.

8. The method according to claim 1, wherein the operating parameter includes rotational speed.

9. The method according to claim 1, wherein the adjustment variable (20) includes a torque.

10. A motor comprising:
a control unit (34) configured to determine a controlled variable (16) in a control loop (14), and
compensate a variation in an operating parameter of the motor, by adjusting (18) the controlled variable (16) by logically combining the controlled variable (16) to an adjustment variable (20) to counteract at least one harmonic oscillation of the operating parameter, wherein a characteristic variable (26) of the harmonic oscillation is determined for setting the adjustment variable (20), wherein the characteristic variable (26) is an amplitude of the harmonic oscillation.

11. A compressor system comprising:
a compressor (38), and
a motor for driving the compressor (38) and including a control unit (34) configured to determine a controlled variable (16) in a control loop (14), and
compensate a variation in an operating parameter of the motor, by adjusting (18) the controlled variable (16) by logically combining the controlled variable (16) to an adjustment variable (20) to counteract at least one harmonic oscillation of the operating parameter, wherein a characteristic variable (26) of the harmonic oscillation is determined for setting the adjustment variable (20), wherein the characteristic variable (26) is an amplitude of the harmonic oscillation.

* * * * *